United States Patent [19]

Shimizu et al.

[11] 4,174,686

[45] Nov. 20, 1979

[54] INTAKE SYSTEM FOR INTERNAL COMBUSTION ENGINES

[75] Inventors: Hiroshi Shimizu, Higashihiroshima; Masamichi Shinohara, Hiroshima, both of Japan

[73] Assignee: Toyo Kogyo Co., Ltd., Hiroshima, Japan

[21] Appl. No.: 840,365

[22] Filed: Oct. 7, 1977

[30] Foreign Application Priority Data

Oct. 9, 1976 [JP] Japan .............................. 51-121531
Dec. 24, 1976 [JP] Japan ......................... 51-175089[U]

[51] Int. Cl.² ......................................... F02B 13/00
[52] U.S. Cl. .............................. 123/75 B; 123/188 M
[58] Field of Search .............. 123/75 B, 188 M, 188 S

[56] References Cited

U.S. PATENT DOCUMENTS

| | | | |
|---|---|---|---|
| 3,408,992 | 11/1968 | Von Seggern et al. | 123/188 M |
| 3,678,905 | 7/1972 | Diehl | 123/188 M |
| 3,861,376 | 1/1975 | Ashley | 123/188 M X |
| 3,926,158 | 12/1975 | Dolza | 123/75 B |
| 4,014,300 | 3/1977 | Klomp | 123/75 B |
| 4,050,422 | 9/1977 | Noguchi et al. | 123/188 S |

*Primary Examiner*—Ira S. Lazarus
*Attorney, Agent, or Firm*—Fleit & Jacobson

[57] ABSTRACT

Internal combustion engine having a primary and a secondary intake passage for each cylinder, the passages opening to the combustion chamber through a common intake port having an intake valve. A substantially radially extending partition plate is disposed at the intake port so as to separate the two passages one from the other when the intake valve is closed. The primary intake passage has a centroid in a cross-section at the intake port and is so located that a line passing through the centroid and the center of the intake port intersects a projection of the cylinder bore at a point of intersection and makes an angle of 50° to 80° with a tangential line of the projection of the cylinder bore at the point of intersection.

3 Claims, 5 Drawing Figures

INTAKE SYSTEM FOR INTERNAL COMBUSTION ENGINES

The present invention relates to internal combustion engines and more particularly to intake systems therefor. More specifically, the present invention pertains to engine intake systems having separated intake passages one for light load and the other for heavy load engine operations.

Hithertofore, proposals have already been made to provide an engine intake system which includes two separated intake passages for each engine cylinder one for light load and the other for heavy load engine operations. The word "light load" as used herein may be construed as including medium load operating range.

In this type of engines, the two passages communicate with a common intake port having an intake valve through which air or air-fuel mixture is introduced into the combustion chamber. Under light and medium load operations as well as idling, the intake passage for heavy load operation which may be referred to as the secondary intake passage is shut-off so that gas for combustion is introduced into the combustion chamber only through the primary intake passage. Under heavy load operation, the secondary passage is opened so that gas is supplied through both of the two passages.

Since the passage for light load operation which may be referred to as the primary intake passage has a cross-sectional area which is small as compared with that of the secondary intake passage, gas for combustion such as combustible air-fuel mixture is introduced into the combustion chamber with a high flow speed. Thus, it is possible to establish an improved atomization and vaporization of fuel. Further, under a heavy load operation, an increased amount of gas is supplied additionally through the secondary intake passage to provide a desired engine output.

Usually, the primary intake passage is located with respect to the axis of the cylinder radially outwardly of the secondary intake passage so that the intake flow through the primary intake passage is given with tangential velocity components to produce an intense swirl of gas in the combustion chamber. The intake flow through the primary intake passage is also effective to accelerate the intake gas which has been supplied through the secondary intake passage in the tangential direction so as to produce a swirl. An example of such conventional arrangement is disclosed in Japanese patent application Sho 46-44002 which has been disclosed for public inspection under the disclosure number of Sho 47-1504.

However, in the conventional arrangements, no further means is provided for intensifying the swirl of gas in the combustion chamber so that it has not been possible to produce an adequately strong swirl irrespectively of the fact that the swirl has a very important effect on the combustion of the air-fuel mixture and that a strong swirl is recommendable to obtain an improved combustion. Particularly, in order to meet the strict regulations for prevention of pollutant emissions in recent years, it has been recognized as being advisable to maintain the air-fuel ratio of the combustible mixture in the vicinity of stoichiometric value and to have an increased amount of combustion gas recirculated to the intake system. In this type of engines, it is particularly important to have an improved combustion in order to ensure a stable engine performance.

It is therefore an object of the present invention to provide an internal combustion engine having an intake system which can produce an intense swirl of gas in the combustion chamber even under light load operation.

Another object of the present invention is to provide an internal combustion engine having an intake system comprising separated intake passages which are so arranged to produce an intense swirl of gas in the combustion chamber.

According to the present invention, the above and other objects can be accomplished by an internal combustion engine comprising cylinder means having cylinder bore means, piston means disposed in said cylinder bore means for reciprocating movement so as to define combustion chamber means therein, intake port means having a center and provided in said cylinder means to open to said combustion chamber means, first and second intake passage means which are separated one from the other and communicate with said intake port means, means for closing said second intake passage means at least under light load engine operation, intake valve means for closing said intake port means, said first intake passage means having a centroid in a cross-section at the intake port means and being so located that a line passing through the centroid and the center of the intake port means intersects a projection of said cylinder bore means at a point of intersection and makes an angle of 50° to 80° with a tangential line of said projection of the cylinder bore means at said point of intersection. The specific location of the first intake passage has been found advantageous in that the gas flow from the first intake passage can be directed to the combustion chamber with a high circumferential velocity component so that an intense swirl of gas can be produced.

According to an additional feature of the present invention, the cylinder means is provided with ignition plug means which is located in the combustion chamber means at a distance not less than one-tenth of the cylinder bore radius from the line passing through the centroid and the center of the intake port means. The specific location of the ignition plug means is found as being effective in preventing ignition failure which may be caused by the fact that the ignition plug may be wetted by the fuel component in the swirl.

The above and other objects and features of the present invention will become apparent from the following descriptions of a preferred embodiment taking reference to the accompanying drawings, in which.

Figure 1:
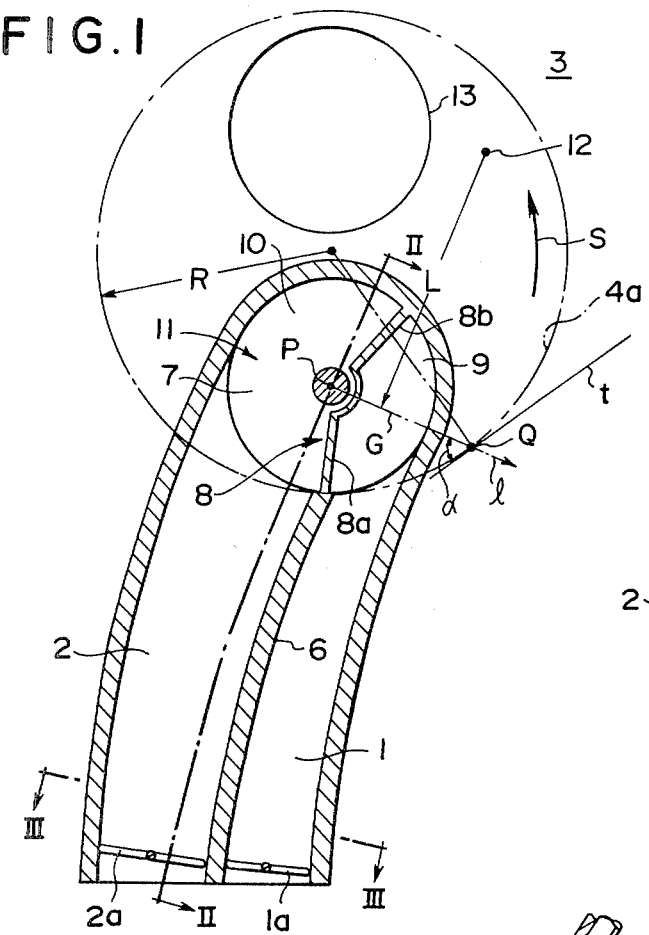
FIG. 1 is a sectional view showing the intake system embodying the features of the present invention.
Figure 3:
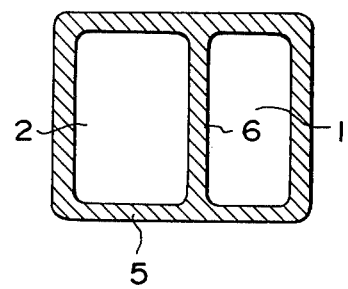
FIG. 3 is a sectional view taken along the line III—III in FIG. 1.
Figure 2:
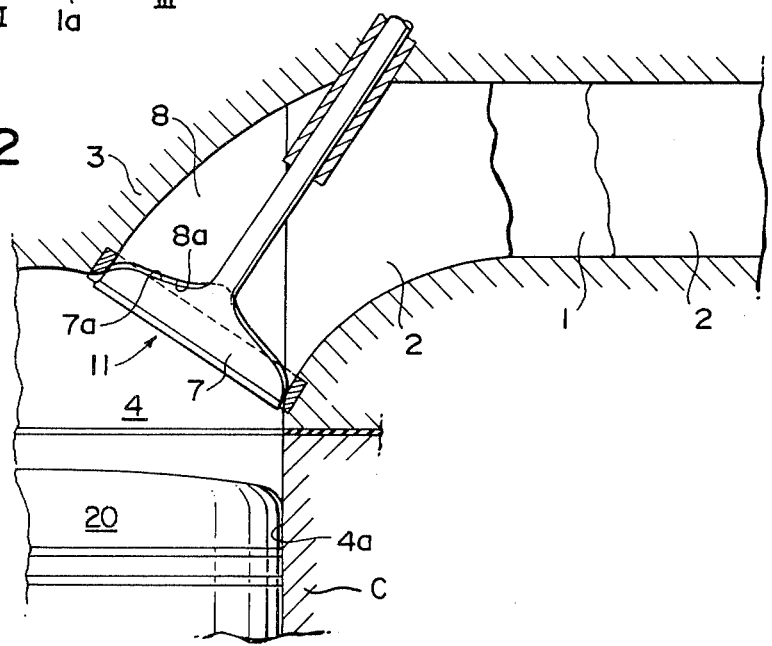
FIG. 2 is a sectional view taken substantially along the line II—II in FIG. 1.

Referring to the drawings, particularly to FIGS. 1 through 3, the internal combustion engine shown therein includes a cylinder assembly which comprises a cylinder C having a cylinder bore 4a and a cylinder head 3 secured to the cylinder C. A piston 20 is disposed in the cylinder bore 4a for reciprocating movement and defines a combustion chamber 4 in the cylinder assembly.

As shown in FIG. 1, the cylinder head 3 is formed with an intake port 11 and an exhaust port 13. The intake system of the engine includes a primary intake passage 1 and a secondary intake passage 2 which are separated one from the other by means of a partition wall 6 and respectively provided with a primary throttle valve 1a and a secondary throttle valve 2a. The secondary throttle valve 2a is normally maintained in the closed position and opened only under a heavy load operation. Thus, air or air-fuel mixture is supplied only through the primary passage 1 under light and medium load operations.

The primary and secondary intake passages 1 and 2 are in communication with the intake port 11 which is provided with an intake valve 7. At the intake port 11, the partition wall 6 merges into a partition wall 8 which includes a pair of radially extending portions 8a and 8b and divides the intake port 11 into a primary port portion 9 and a secondary port portion 10. As shown in FIG. 2, the partition wall 8 has an edge 8a which is complementary to the back contour 7a of the intake valve 7 so that the port portions 9 and 10 are substantially separated when the valve 7 is closed. Since the primary port portion 9 has a comparatively small area, the air or air-fuel mixture can be introduced into the combustion chamber with a relatively high speed even under a light load operation.

The intake port 11 is of a circular configuration having a center P and the primary port portion 9 has a centroid G. A line l passing through the center P of the intake port 11 and the centroid G of the port portion 9 intersects the projection of the cylinder bore 4a at the point Q. A tangential line t of the projection of the cylinder bore 4a at the point Q makes an angle $\alpha$ with the line l. According to the present invention, the primary port portion is so located with respect to the center P of the intake port 11 that the angle $\alpha$ is between 50° and 80°.

Assuming that the gas for combustion flows uniformly through the primary intake port portion 9 and is deflected by the back contour 7a of the intake valve 7 as it enters the combustion chamber 4, the line l is considered as representing the center of such intake flow. Thus, it is understood that the angle $\alpha$ between the lines l and t has an important effect on the intensity of the swirl S in the combustion chamber 4.

Figure 4:
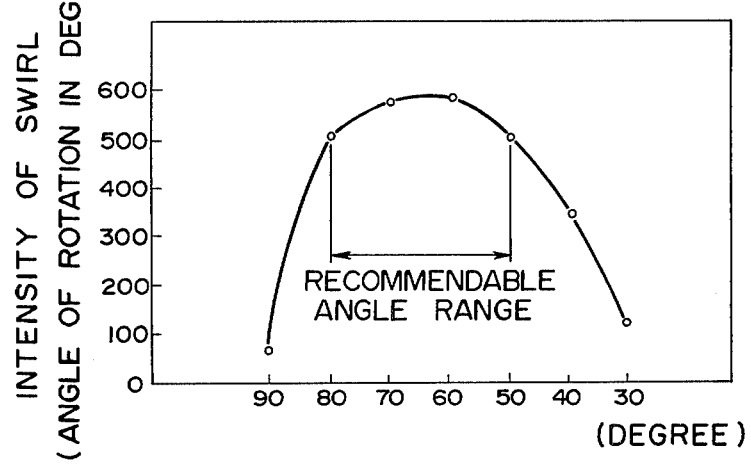
FIG. 4 is a diagram showing the relationship between the location of the primary intake passage and the intensity of swirl.

In FIG. 4, there is shown the relationship between the angle $\alpha$ and the intensity of the swirl S. The intensity of the swirl S has been measured in terms of angle of rotation of fan blades positioned in the combustion chamber. As noted in FIG. 4, an extremely strong swirl can be obtained with the angle $\alpha$ in the range between 50° and 80°. With the angle $\alpha$ greater than 80°, substantial part of kinetic energy in the intake flow is dissipated as the flow is smashed against the cylinder wall. With the angle $\alpha$ less than 50°, the intake flow is allowed to spread so that the swirl S is weakened.

Figure 5:
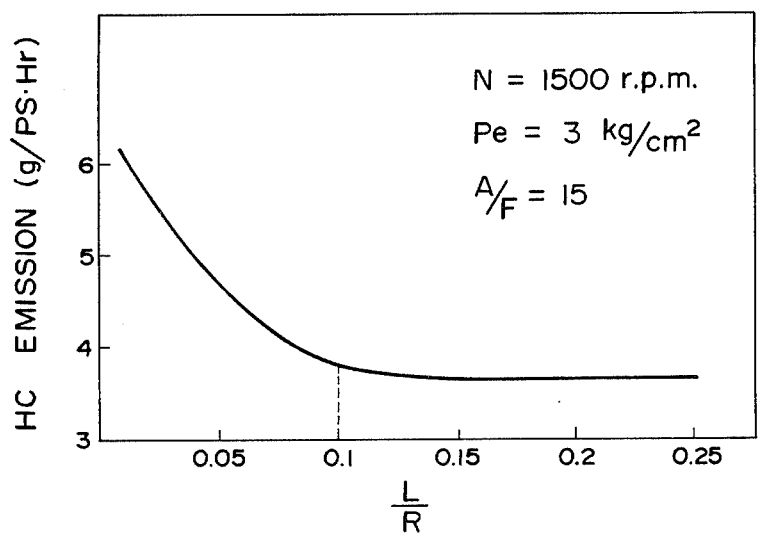
FIG. 5 is a diagram showing the relationship between the location of the ignition plug and the pollutant emissions.

The cylinder head 3 is provided with an ignition plug 12 which is located at a distance L from the line l. According to a further feature of the present invention, the distance L is not less than one-tenth of the radius R of the cylinder bore 4a. FIG. 5 shows the effect of the distance L on the HC emission. The tests have been performed with the engine speed of 1500 R.P.M., the mean effective pressure of 3 Kg/cm² and the air-fuel ratio of 15. It will be noted in FIG. 5 that with the ratio L/R less than 0.1 the HC emission is increased. It is understood that this tendency is caused by the fact that the ignition plug 12 is wetted by the fuel component in the swirl when the plug 12 is located too close to the intake port. With the ratio L/R greater than 0.1, the HC emission can be decreased remarkably.

Under a heavy load operation, the throttle valve 2a is opened so that the gas for combustion is introduced additionally through the secondary intake passage 2 into the combustion chamber 4 to provide a desired engine output.

The invention has thus been shown and described with reference to a specific embodiment, however, it should be noted that the invention is in no way limited to the details of the illustrated structures but changes and modifications may be made without departing from the scope of the appended claims.

We claim:

1. Internal combustion engine comprising cylinder means having cylinder bore means, piston means disposed in said cylinder bore means for reciprocating movement so as to define combustion chamber means therein, intake port means having a center and provided in said cylinder means to open to said combustion chamber means, first and second intake passage means which are separated one from the other and communicate with said intake port means, said first intake passage means being smaller in cross-sectional area than the second intake passage means, wall means extending radially of said intake port means and separating said first and second intake passage means at said intake port means, means for closing said second intake passage means at least under light load engine operation, intake valve means having a back contour and provided for closing said intake port means, said first intake passage means having a centroid in a cross-section at the intake port means and being so located that a line passing through the centroid and the center of the intake port means intersects a projection of said cylinder bore means at a point of intersection and makes an angle of 50° to 80° with a tangential line of said projection of the cylinder bore means at said point of intersection, whereby the first intake passage means is located with respect to the axis of said cylinder bore means radially outwardly of said second intake passage means at said intake port means.

2. Internal combustion engine in accordance with claim 1 in which said cylinder means is provided with ignition plug means which is located in the combustion chamber means at a distance not less than one-tenth of cylinder bore radius from the line passing through the centroid of the first intake passage means and the center of the intake port means.

3. Internal combustion engine in accordance with claim 1, wherein said back contour of said intake valve means cooperates with said wall means to separate said first and second intake passage means from each other when said intake valve means is closed.

* * * * *